| United States Patent [19] | [11] 3,819,018 |
|---|---|
| Muller et al. | [45] June 25, 1974 |

[54] BRAKE ASSEMBLY FOR EXCAVATOR SWING TRANSMISSION

[75] Inventors: Thomas P. Muller, Aurora; Gary L. Popdan, Oswego, both of Ill.

[73] Assignee: Caterpillar Tractor Co., Peoria, Ill.

[22] Filed: Dec. 4, 1972

[21] Appl. No.: 311,876

[52] U.S. Cl. .............................................. 192/8 R
[51] Int. Cl. ............................................. F16d 67/04
[58] Field of Search ........ 192/8; 214/130, 132, 133; 188/170

[56] References Cited
UNITED STATES PATENTS

| | | | |
|---|---|---|---|
| 2,347,456 | 4/1944 | Beckwith | 214/132 X |
| 2,354,863 | 8/1944 | Huston | 214/132 X |
| 2,928,513 | 3/1960 | Rhodes et al. | 192/4 R |
| 2,997,146 | 8/1961 | Chiolerio | 192/8 R |
| 3,647,030 | 3/1972 | Burnett | 188/170 X |
| 3,688,877 | 9/1972 | Day | 188/170 X |
| 3,726,367 | 4/1973 | Evans | 188/170 X |

*Primary Examiner*—Samuel Scott
*Assistant Examiner*—Lance W. Chandler
*Attorney, Agent, or Firm*—Phillips, Moore, Weissenberger, Lempio & Strabala

[57] ABSTRACT

An excavator has a revolving upper unit rotatably mounted on a mobile undercarriage. The upper unit has a drive motor mounted thereon which rotates a swing pinion through a speed reduction gear train of a transmission for selectively revolving the upper unit on the undercarriage. A brake assembly is operatively connected between an output shaft of the drive motor and an input shaft to the transmission to selectively prevent rotation of the swing pinion. The braking means includes a coupling member splined between the input and output shafts and a pump is operatively connected to the input shaft to communicate lubricating oil to the spline connection, through a passage formed in the input shaft.

10 Claims, 3 Drawing Figures

BRAKE ASSEMBLY FOR EXCAVATOR SWING TRANSMISSION

BACKGROUND OF THE INVENTION

A standard power transmission employed in an excavator comprises a motor-driven speed reduction gear train and a swing pinion which rotates against a stationary ring gear to selectively rotate an upper unit relative to a mobile undercarriage. A brake is normally employed for selectively locking the upper unit to the undercarriage during digging operations to enable the operator to make a straight cut with a standard earthworking implement mounted on the upper unit.

The brake may also be engaged for parking purposes to prevent movement of the upper unit when the vehicle is not operating. Conventional brake assemblies are normally "buried" in the drive transmission to render them inaccessible for expeditious servicing. In addition, the braking effort is normally applied in the transmission proper, thus requiring a large braking capacity.

SUMMARY OF THIS INVENTION

An object of this invention is to overcome the above, briefly described problems by providing a compact and readily serviceable brake assembly, particularly adapted for use in an earthworking machine such as an excavator. The braking means of the brake assembly includes a coupling member detachably connected to the output shaft of a drive motor and to the input shaft to a power transmission, adapted to rotate an upper unit relative to a mobile undercarriage. A lubrication system is preferably provided which comprises a pump driven by such input shaft to communicate lubricating oil through a passage formed in the input shaft and to a spline connection connecting the output and input shafts together.

BRIEF DESCRIPTION OF THE DRAWINGS

Other objects of this invention will become apparent from the following description and accompanying drawings wherein.

DETAILED DESCRIPTION

Figure 1:
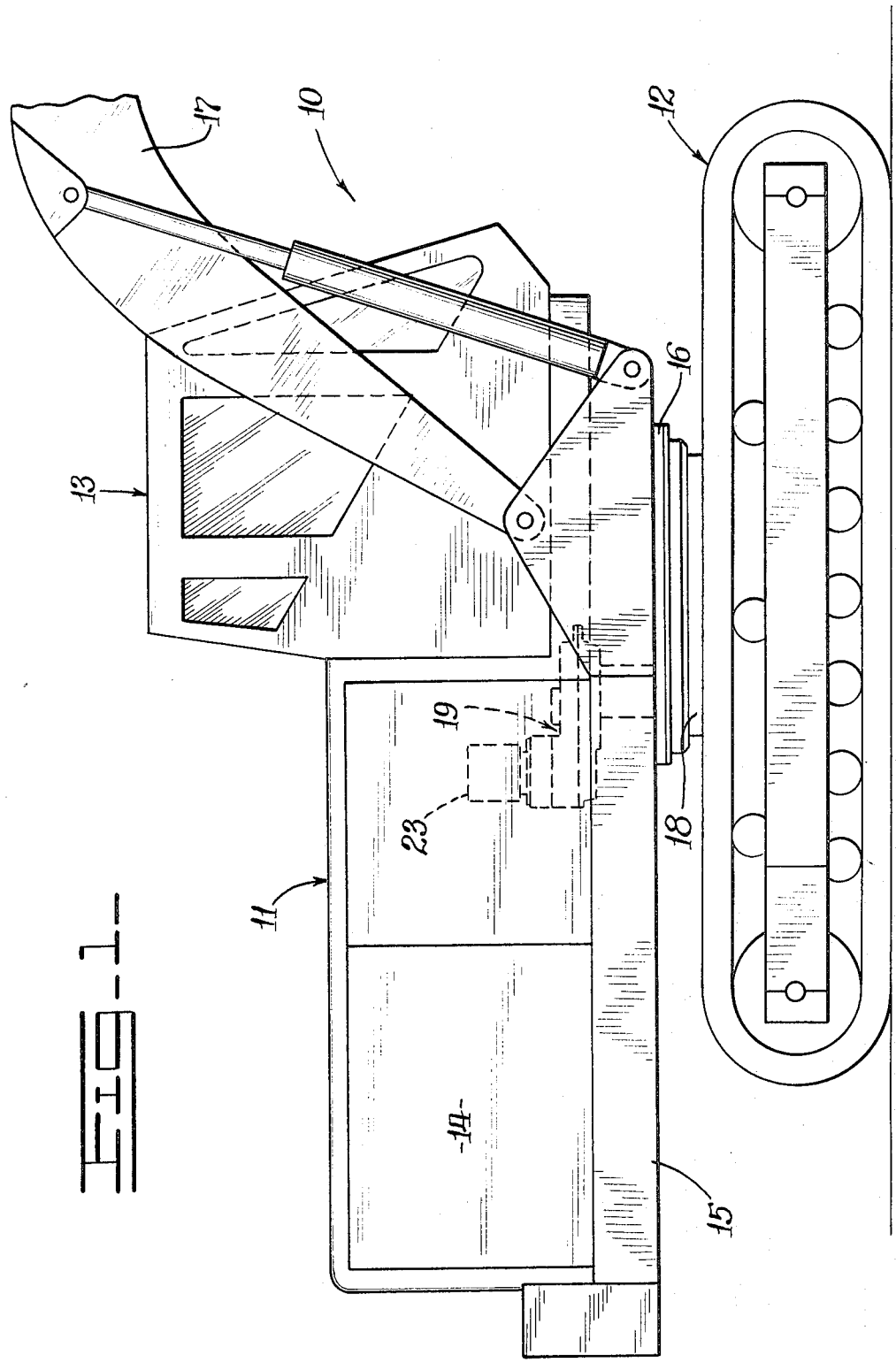
FIG. 1 is a partial, side elevational view of an excavator, showing the general location of a motor driven swing transmission therein.

FIG. 1 illustrates an earthworking machine 10, such as an excavator, having an upper unit 11 rotatably mounted on a tracked, mobile undercarriage 12. The upper unit includes an operator's station 13 and a power plant 14 carried on a common frame 15 having a support housing or annular turntable 16 secured thereunder. A standard earthworking implement may be suitably attached to a partially illustrated boom 17, pivotally mounted on the front end of upper unit 11. The upper unit is adapted to be selectively rotated on a base 18 of the undercarriage by a detachable power transmission 19.

Figure 2:
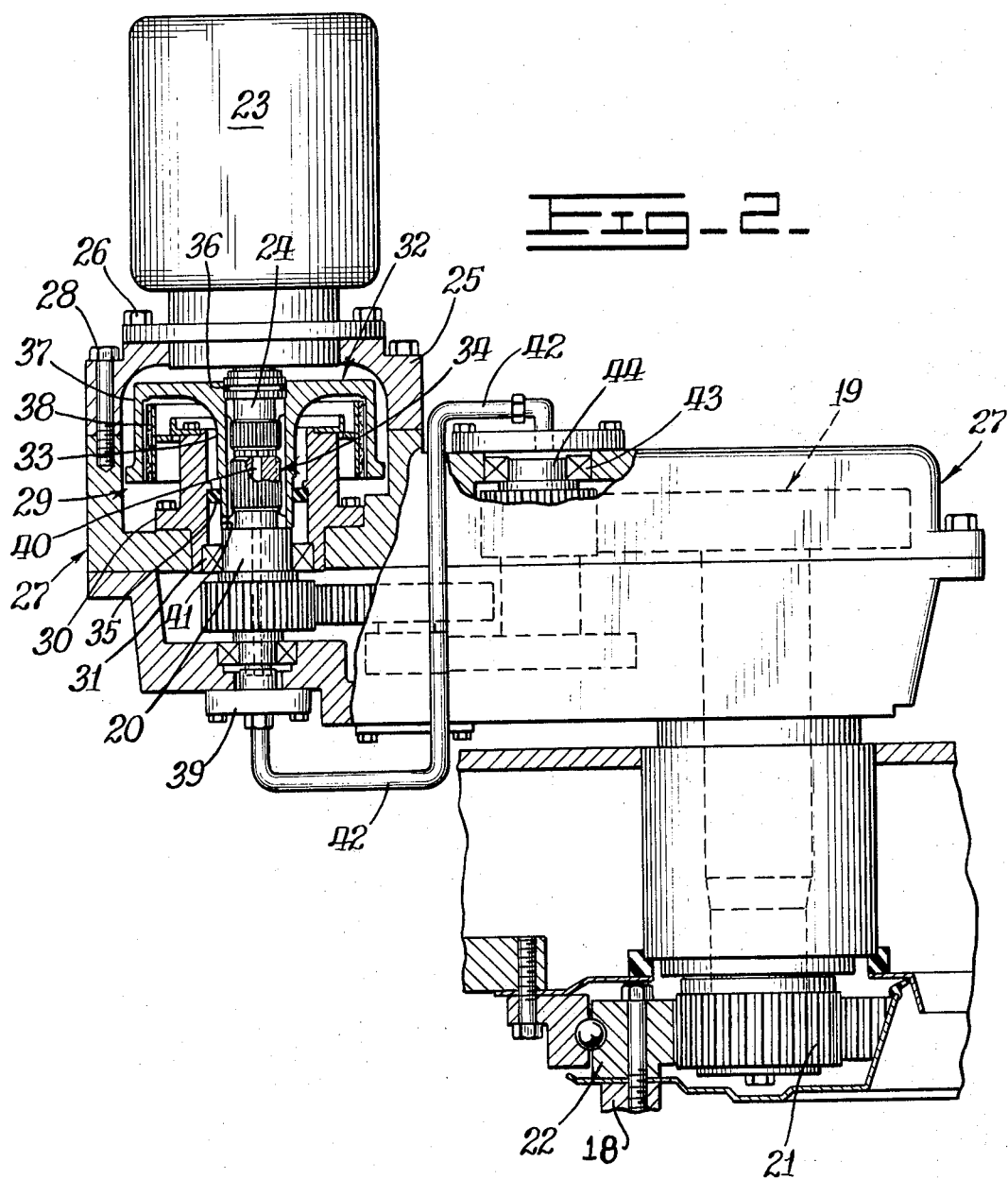
FIG. 2 is an enlarged side elevational view of the motor driven swing transmission with parts broken-away to disclose a brake assembly of this invention associated therewith.

Referring to FIG. 2, the power transmission comprises an input shaft 20 for driving a swing pinion 21 against a stationary reaction-type ring gear 22, secured to base 18. The transmission is fully disclosed in U.S. Patent application Ser. No. 237,377, filed on Mar. 23, 1972, now U.S. Pat. No. 3,739,652 by Samuel I. Caldwell et al for "Swing Transmission for Excavators."

An operator controlled, reversible hydraulic motor 23 has an output shaft 24 extending downwardly therefrom. The motor's housing is detachably mounted to a cover 25 by bolts 26 and the cover is detachably mounted to a transmission case or housing 27 by bolts 28. A brake assembly 29 is operatively integrated between output shaft 24 of the motor and power transmission 19 to be normally engaged to prevent rotation of swing pinion 21.

The brake assembly comprises an annular housing 30 detachably mounted on transmission case 27 of the upper unit and rotatably mounts the upper end of input shaft 20 therein by an annular bearing means 31. A coupling member 32 comprises a sleeve portion 33 which detachably connects axially aligned shafts 20 and 24 together by a common spline connection 34. Sealing means, comprising axially spaced annular seals 35 and 36 respectively mounted between sleeve portion 33 and housing 30 and output shaft 24 and the sleeve portion, prevent communication of lubricating oil thereby and into a "dry" brake chamber.

The coupling member further comprises an annular drum portion 37 of a braking means which surrounds sleeve portion 33. The braking means further comprises expandable brake shoe means 38, suitably mounted on housing 30 in a conventional manner to normally expand radially outwardly into frictional engagement with the drum portion to prevent rotation of the coupling member. Standard control and linkage means (not shown) are operatively connected to the brake shoe means to selectively retract same to release the coupling member whereupon motor output shaft will drive transmission input shaft 20 when it is desired to rotate swing pinion 21 (FIG. 1).

Lubricating means are preferably provided for communicating lubricating oil internally of sleeve portion 33 of the coupling member to continuously lubricate spline connection 34. Such lubricating means comprises a standard pump means 39 operatively connected to the lower end of input shaft 20 to be driven thereby and a rifle passage 40 formed through the input shaft to terminate adjacent to an end of output shaft 24. The lubricating oil thereafter passes along spline connection 34 and passes through port means 41, formed through sleeve portion 33, to communicate lubricating oil to annular bearing means 31.

It should be noted that annular seals 35 and 36 isolate brake shoes 38 to prevent the communication of lubricating oil thereto since they preferably function best in a dry state. The lubricating means may comprise conduit means 42 for communicating lubricating oil from pump means 39 to an annular bearing means 43. The latter bearing means rotatably mounts the upper end of a shaft 44 of the gear train on transmission case 27.

Figure 3:
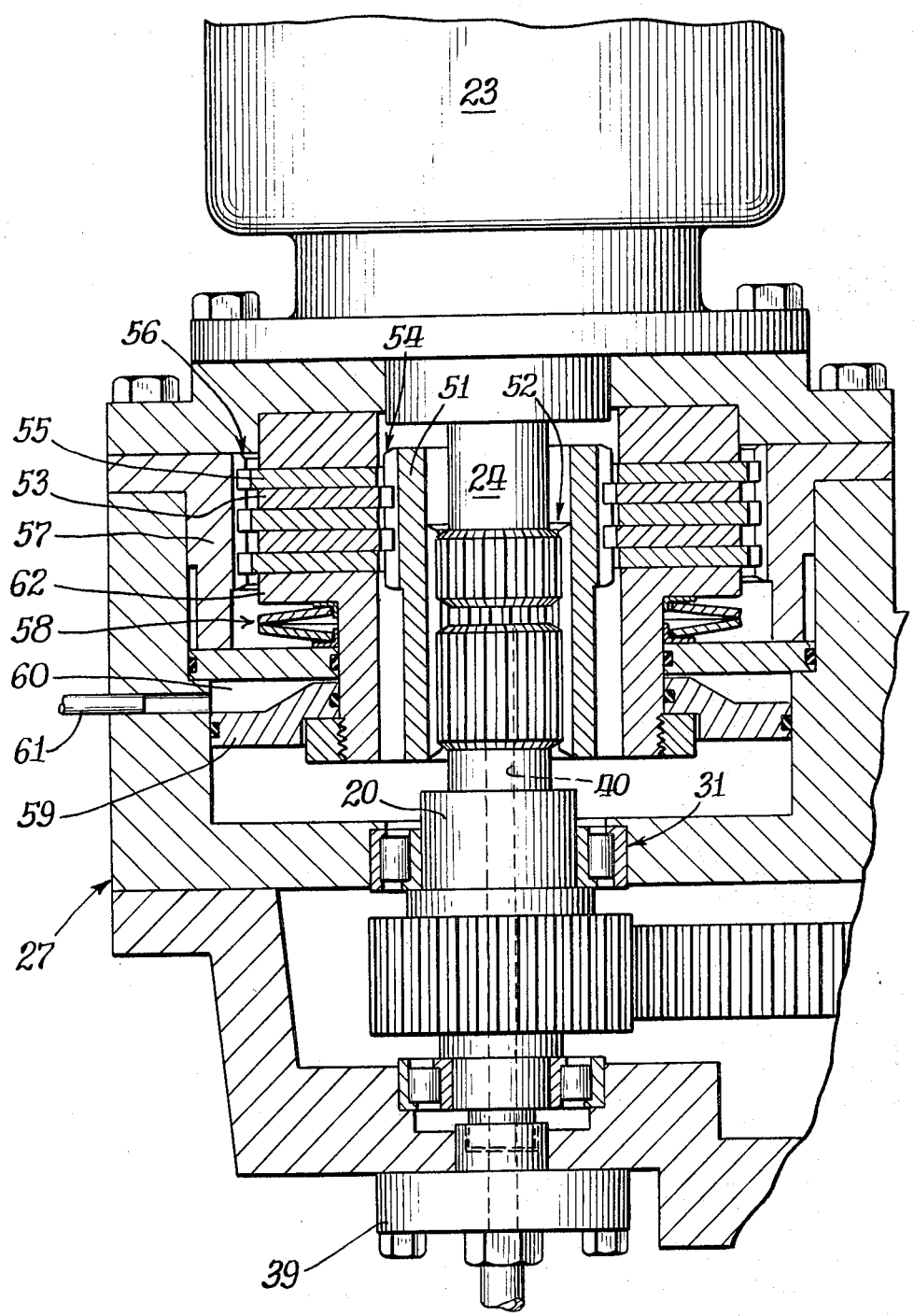
FIG. 3 is an enlarged cross sectional view disclosing an alternative embodiment of the brake assembly.

FIG. 3 illustrates an alternative embodiment of the brake assembly which is similar to that disclosed in U.S. Patent application Ser. No. 242,724 for "Modular Brake Assembly," filed on Apr. 10, 1972, now Pat. No. 3,771,627 by Samuel I. Caldwell et al. Such brake assembly comprises braking means including a coupling member 51 in the form of a sleeve which connects motor output shaft 24 to transmission input shaft 20 at a common spline connection 52. The braking means further comprises a first set of friction discs 53, splined at 54 to the sleeve for axial movement thereof. The first set of friction discs are interleaved with a second set of friction discs 55, splined at 56 to an annular housing member 57 mounted on transmission case 27.

Spring means 58, preferably comprising back-to-back Belleville spring washers, of the brake actuating means are mounted between the housing and the friction discs to normally compress the discs together to prevent rotation of sleeve 51. A piston 59 is reciprocally mounted in the housing to be moved downwardly upon pressurization of an actuating chamber 60, via a conduit 61 suitably integrated with an operator-controlled hydraulic control circuit. Downward movement of the piston will, in turn, move the pressure plate of a sleeve 62 downwardly to compress the springs to release the braking means. Motor output shaft 24 is thus free to rotate transmission input shaft 20 for purposes above described.

What is claimed is:

1. An earthworking machine comprising
a power transmission having an input shaft,
a drive motor having an output shaft,
a brake assembly comprising braking means, including a coupling member detachably connecting said input and output shafts directly together against relative rotation, for selectively preventing rotation of said coupling member,
an upper unit,
a mobile undercarriage, and
means rotatably mounting said upper unit on said undercarriage and wherein said power transmission, drive motor and brake assembly are mounted on said upper unit, and said input and output shafts are axially aligned.

2. The invention of claim 1 wherein said coupling member is connected to said input and output shafts by a common spline connection.

3. The invention of claim 1 wherein said coupling member comprises a sleeve portion connected to said input and output shafts and an annular drum portion surrounding said sleeve portion, said braking means further comprising a housing member and expandable brake shoe means mounted on said housing for selectively engaging said drum portion.

4. The invention of claim 1 wherein said coupling member comprises a sleeve connected to said input and output shafts, said braking means further comprising a first set of friction discs mounted for axial movement on said sleeve, a housing member, a second set of friction discs mounted for axial movement on said housing member and interleaved with said first set of friction discs, and actuating means for selectively compressing said first and second sets of friction discs together.

5. The invention of claim 4 wherein said actuating means comprises spring means mounted between said housing member and said friction discs for normally compressing said first and second sets of friction discs together and an annular piston means reciprocally mounted in said brake assembly for selectively compressing said spring means to release said braking means.

6. The invention of claim 1 further comprising lubricating means for communicating lubricating oil internally of said coupling member to its connection with said input and output shafts.

7. The invention of claim 6 wherein said lubricating means comprises a pump means operatively connected to said input shaft to be driven thereby and means forming a passage in said input shaft to communicate lubricating oil internally of said coupling member.

8. The invention of claim 6 further comprising sealing means mounted in said brake assembly for preventing communication of lubricating oil to brake shoes of said braking means.

9. The invention of claim 8 further comprising annular bearing means rotatably mounting said coupling member in said brake assembly and port means communicating lubricating oil to said bearing means.

10. The invention of claim 7 wherein said power transmission comprises a gear train including a shaft rotatably mounted in said power transmission by annular bearing means and wherein said lubricating means further comprises conduit means communicating lubricating oil from said pump means to said bearing means.

* * * * *